Jan. 31, 1956    R. E. B. WAKEFIELD    2,733,408
GALVANOMETERS
Filed Aug. 29, 1951    2 Sheets-Sheet 2
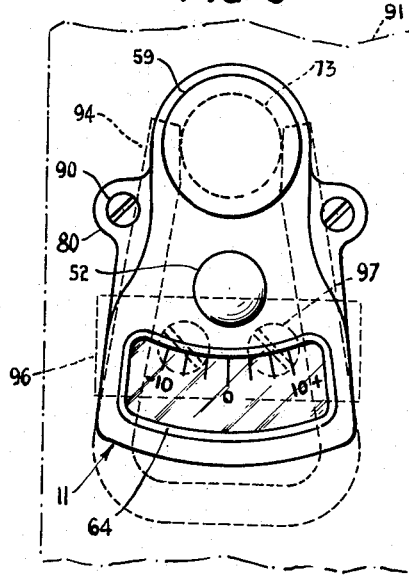
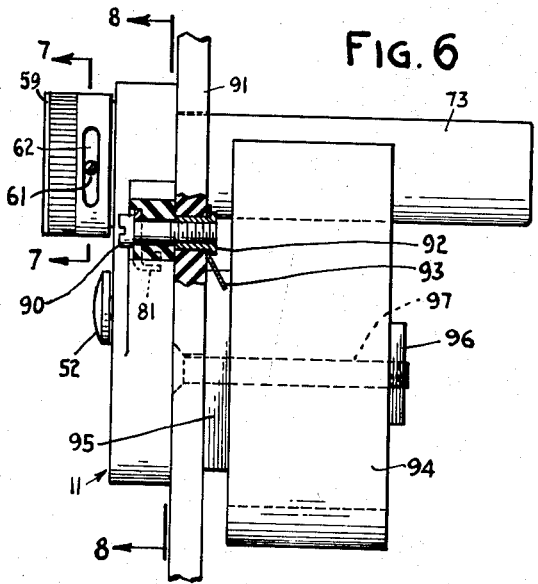
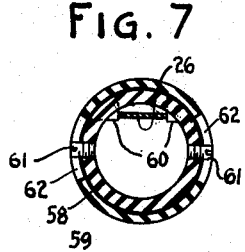
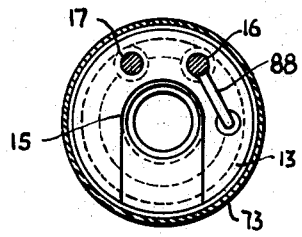
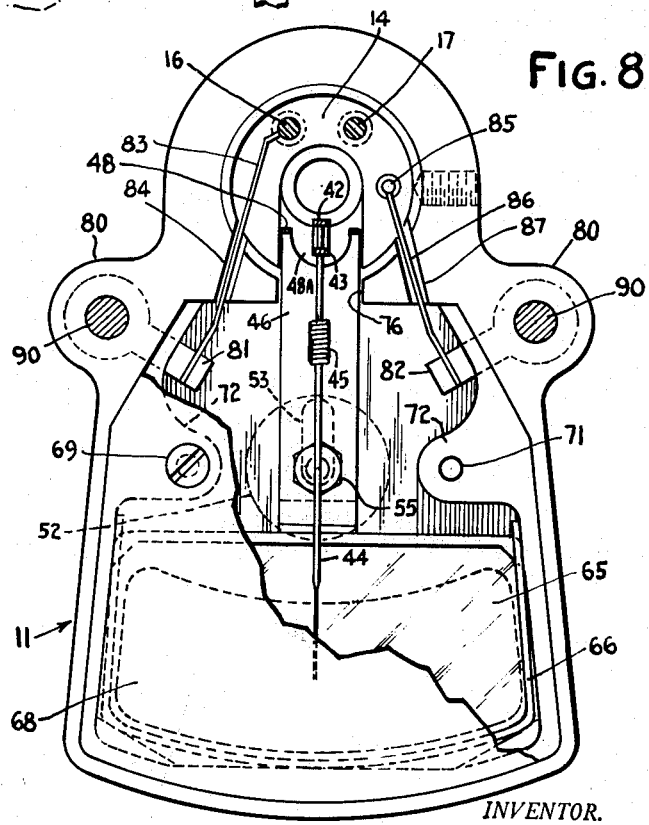
INVENTOR.
RICHARD E.B. WAKEFIELD
BY
M. Theodore Simmons
ATTORNEY

United States Patent Office 2,733,408
Patented Jan. 31, 1956

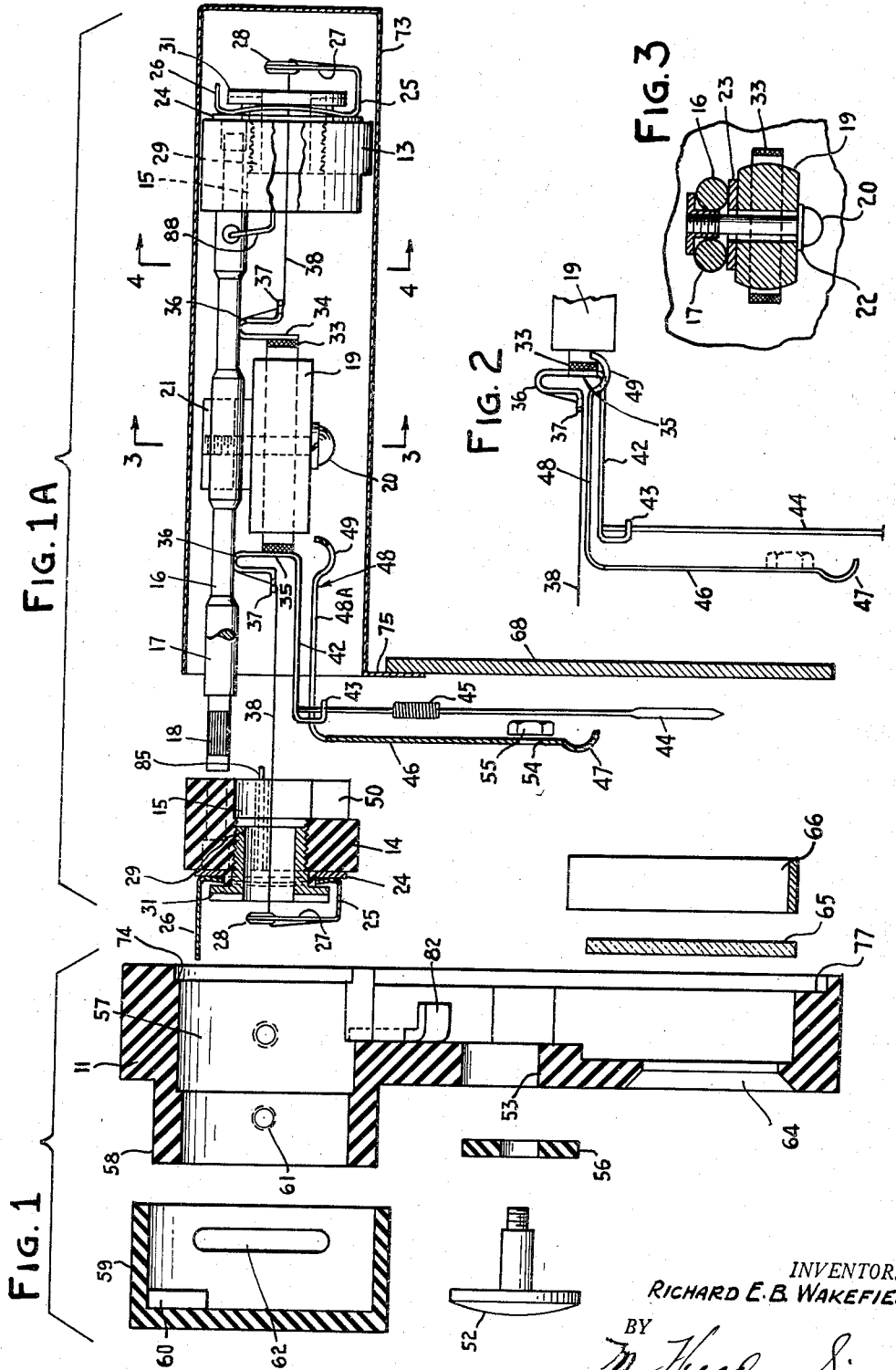

2,733,408

GALVANOMETERS

Richard E. B. Wakefield, Aldan, Pa., assignor to Shallcross Manufacturing Company, Collingdale, Pa.

Application August 29, 1951, Serial No. 244,175

3 Claims. (Cl. 324—154)

This invention relates to galvanometers having various novel features.

Among the objects of the invention are to provide a galvanometer of greater sensitivity and accuracy; an improved arrangement of structural elements which permit the mechanical parts of the galvanometer to be completely assembled, outside the casing, in the nature of a sub-assembly, prior to incorporating the sub-assembly into the galvanometer instrument case; novel means and methods of adjustment of the parts both while in the sub-assembly stage, and after assembly into the case; a novel galvanometer coil which is extremely sensitive due to reduced inertia; and a galvanometer in which all the elements except the magnetic system are assembled into an instrument case which may be mounted on a panel independently of the magnet after which the magnet may be positioned on the ear of the panel in the proper relationship to the movable galvanometer coil.

These and other objects of the invention will be apparent from the following description taken in conjunction with the accompanying drawings, in which:

Figure 1 is an exploded view of the galvanometer case and directly associated elements;

Fig. 1A is a somewhat exploded view of the sub-assembly of mechanical parts of the galvanometer of my invention, parts being broken away to facilitate illustration;

Fig. 2 is a fragmentary view of the galvanometer locking clamp engaging the galvanometer coil;

Fig. 3 is a sectional detail taken on line 3—3 of Fig. 1A;

Fig. 4 is a sectional detail taken on the line 4—4 of Fig. 1A;

Fig. 5 is a front view of the galvanometer instrument positioned upon a panel with the magnet arrangement shown in phantom outline;

Fig. 6 is a side view, partly in section, of the galvanometer and magnet assembled upon a panel;

Fig. 7 is a sectional view of the zero control knob taken on line 7—7 of Fig. 6; and Fig. 8 is an enlarged rear view, partly in phantom outline, of the instrument taken along line 8—8 of Fig. 6

Referring to the drawings in detail, the sub-assembly (Fig. 1A) consists of two molded Bakelite suspension blocks 13 and 14 each of which has a central threaded aperture 15 positioned axially opposite each other. The suspension blocks are connected to each other by means of two parallel support rods 16 and 17 (Fig. 3), the ends of which are reduced in diameter and have knurled surfaces 18 which securely position the rods in the blocks 13 and 14.

Approximately midway between the ends of support rods 16 and 17 a soft iron core 19 is suspended by means of bolt 20, the nut 21 of which has flanges which rest upon the central portions of the support rods. The head of bolt 20 is separated from core 19 by means of lock washer 22 while the core is separated from the support rods by means of washer 23.

The coil suspension and construction will be described now. Each block 13 and 14 has an outwardly projecting collar around which is positioned metal collector ring 24, and a metal suspension spider 25. The top of spider 25 has a tab 26 which extends substantially perpendicular to and outwardly from the suspension block, and the lower end of the spider has a perpendicular extension which is bent into an upright arm 27 and terminates in an eyelet 28 that is aligned approximately with the longitudinal dimension of apertures 15.

The central circular portion of each suspension spider 25 is slightly warped in an axial direction to provide a frictional mounting therefor between collector ring 24 and the flange 31 of bushing 29 which is threaded into the central aperture 15 of each suspension block. As the flange 31 bears upon the warped section of the suspension spider 25, other portions of the spider are urged against the collector ring 24. At the same time, it is to be noted that spiders 25 are manually rotatable around the axes of blocks 13 and 14, as will be described.

Coil 33, arranged to be suspended around core 19, is formed of a plurality of fine wires wound and banded together into the shape of a parallelogram whose sides are freely movable around the sides of the core. In order to reduce the weight of the coil, the bobbin customarily used as a base and support for such galvanometer windings is dispensed with, and instead, the wire to be wound into the coil is coated with a cellulose cement or other binder. The wire is wound around a suitable form and after the cement has dried, thereby forming a self-supporting compact of wire windings, the form is removed. With such construction the efficiency of the galvanometer is increased since less strain is placed upon the supporting means for the coil, while inertia is reduced to permit greater sensitivity of the coil for rapid deflection when current passes through the windings.

Mounting brackets 34 and 35 are fastened, by means of cellulose cement, or otherwise, to the opposite flat ends of coil 33. Each bracket 34 and 35 has a looped resilient arm 36 terminating in a perpendicular extension 37 in which is a small aperture. Each bracket 34 and 35 are connected to the respective spiders 25 by means of very fine flat suspension wires 38.

It is believed necessary to describe the suspension at only one end of the coil. One end of each suspension wire 38 is fastened to the top of loop 36, passes through the aperture in extension 37, and through eyelet 28 of spider 25, with the other end of the wire secured to the outside of arm 27 of spider. The curvature and resilience of both loop 36 and arm 27 are adjusted to provide the proper tension upon suspension wire 38 to maintain coil 33 in the optimum position around core 19 while at the same time the coil is permitted to rotate freely around the core in response to electrical currents passing through the coil windings. It also will be understood that positioning and balancing of the coil is obtained through the manual adjustment of either or both of the spiders 25.

Bracket 35 attached to the left end of coil 33 has a lower elongated extension 42 which terminates in a downwardly depending, inturned hook 43 having a small bore therein. Extending through said bore and secured to extension 42 and hook 43 is a scale pointer 44. A balance weight 45, in the form of a helical wire winding, is positioned on the shaft of pointer 44 and is adjustable along the length thereof for determining the optimum balancing position thereof. Since pointer 44 is mechanically connected to coil 33 by extension 42 and bracket 35, any deflection in coil 33 responsive to changes in current passing therethrough will be indicated by a corresponding tilting motion of pointer 44.

Before the sub-assembly is mounted in the galvanometer casing a locking clamp is secured in the casing. This clamp consists of a strip of metal 46 terminating at its lower end in pressure bead 47 and at its upper end in horizontal extension 48. Extension 48 is substantially parallel to needle carrier 42 and has a longitudinal slot 48A therein, within which carrier 42 and needle 44 are free to rotate. The free end of extension 48 has a spoon-like terminus 49 which is adapted to engage coil 33 and holds it in an immobile position.

The clamp is mounted and moved in the galvanometer case 11 by means of lock button 52, the shaft of which extends through slot 53 in case 11 and through aperture 54 in clamp member 46. The clamp is held in position by nut 55 and washer 56 on the shaft of button 52 with the pressure head 47 engaging the inner wall of case 11.

When the galvanometer is in use the locking clamp and its button are in the lowered position, shown in Fig. 1. When the galvanometer is not in use, locking button 52 is pushed upwards manually, whereupon the spoon terminus 49 of locking clamp is raised to engage or lift coil 33 into an immobile position, as seen in Fig. 2. Since pointer 44 is connected to coil 33, this operation of locking the coil also locks the pointer. In this manner the delicate coil, suspension wires and pointer also are protected from possible damage when not in use.

The case 11 is an open back shell having a through cavity 57 with a collar 58 extending forwardly and surrounding the open front of cavity 57. When the sub-assembly of Fig. 1A is ready to be mounted in the case, its block 14 is pressed into cavity 57, and the projecting portions of tab 26 and arm 27 of spider 25 are received within the collar 58.

It is to be noted that the inner side of suspension block 14 has an open channel 50 which is open at its bottom and within which the left end of bracket extension 42, the hook 43, and the upper ends of locking clamp 46 and pointer 44 are received and are free to move, respectively. The sides of the slot serve as guides for the clamp 46 as it slides up and down.

A molded Bakelite cap 59 fits rotatably over collar 58 on case 11. Inside cap 59 are a pair of spaced lugs 60 (Fig. 7) between which elongated tab 26 of the left hand suspension spider 25 is accommodated when the cap is mounted in place.

Collar 58 carries two screws 61, which are 180° apart, and cap 59 has two elongated slots 62 positioned opposite each other to cooperate with screws 61. Cap 57 may be rotated, whereupon its lugs 60 engage tab 26 and turn the left hand spider 25 to adjust the position of coil 33 as necessary. The rotation of cap 57 is limited by the ends of the slots 62 impinging upon the heads of screws 61 to prevent any accidental damage or over adjustment within the galvanometer.

The lower part of case 11 has a window aperture 64 behind which a cover glass 65 is held in position by expansible clamp 66 (Figs. 1 and 7) engaging the inside walls of case 11 whereby both the clamp 66 and cover glass 65 are retained in position. The case 11 also has a pair of apertured mounting ears 80 from the rear of which connection lugs 81 and 82 (Fig. 8) extend into the interior of case 11.

Once the sub-assembly of Fig. 1A is secured in case 11, a wire connection 83 is made between support rod 16 and terminal lug 81, the case 11 being suitably channeled at 84 to position the wire 83. Also, a pin 85 (Figs. 1A and 8) extends through the block 14 from its collector ring 24 and terminates on the interior of the case, when the block 14 is positioned therein. The pin 85 is connected by wire 86 to lug 82, the casing being suitably channeled at 87 to position the wire 86.

At the opposite end of rod 16 an electrical connection is made thereto by means of wire or pin 88 extending from the rod, through a suitable channel in block 13 and engaging the collector ring 24 on block 13. Thus, the electrical circuit extends from lug 81 through wire 83 to rod 16, from rod 16 and wire 88 to the right hand collector ring 24 and thence through its cooperating spider 25 to the coil 33 by means of the right hand suspension wire 38. The path then extends from the other side of the coil, by means of the left hand suspension wire 38, to the spider 25 of block 14, its cooperating collector ring 24, and wire 86 to lug 82.

To enclose the galvanometer, an aluminum cylindrical cover can 73 is slipped over the part of the sub-assembly of Fig. 1A which protrudes beyond the case 11. The inner open end of can 73 is slid into a recess in, and abuts shoulder 74, of case 11. Can 73 also has a depending tab 75 at its open end, and case 11 is slotted at 76 (in line with slot 50 in block 14) to receive the tab 75 so that can 73 is prevented from rotating.

A galvanometer scale plate 68, having graduated scale markings on the front side, which are visible through window 64, is mounted within a recess on the back of the galvanometer case and rests against a shoulder 77. Scale plate 68 covers tab 75 of can 73 (Fig. 1A) and is secured in position by means of screws 69 which engage threaded apertures 71 in shoulder projections 72 within case 11.

Both ears 80 of case 11 are adapted to receive screws 90 (Fig. 6) which serve to secure the galvanometer to a panel 91, for example. Appropriate threaded bushings 92 on said panel may accommodate said screws and hold external connector lugs 93 whereby the galvanometer may be connected to the external apparatus or circuit with which it is to be used.

In order to provide a magnetic field for the galvanometer, a permanent magnet 94 (Figs. 5 and 6) of the so-called horseshoe shape, is connected to the panel 91 by means of spacer 95, clamping bar 96, and screws 97 inserted through panel 91 and threadably engaging the clamping bar. Magnet 94 is secured to the panel with the pole pieces of the magnet positioned at each side of can 73 opposite core 19 so that the lines of magnetic force are directed substantially parallel to the windings of coil 33 when the latter is at rest.

From the foregoing description it is apparent that important advantages are realized by virtue of the novel structural arrangement of the component parts. For example, mass production methods and practices can be used to a considerable extent, and many parts are duplicates. Again, the core and coil and associated parts are first put together into a sub-assembly on the open bench where delicate adjustments and calibrations can be made without being hindered by instrument cases or the like; and after the components of the sub-assembly are connected and adjusted, the sub-assembly is simply inserted into the galvanometer case and secured therein. The case is then closed with a few simple parts and operations.

When the galvanometer is to be used for testing or measurement, any needed adjustment of the zero setting of pointer 44 relative to scale plate 68 can be made readily, by simply rotating cap 59 in either direction.

Furthermore, by placing the magnet outside of the galvanometer assembly, the position of the magnet can be adjusted manually to provide the optimum magnetic field for the galvanometer coil and core.

In the specification, I have explained the principles of my invention and the best mode in which I have contemplated applying those principles, so as to distinguish my invention from other inventions; and I have particularly pointed out and distinctly claimed the part, improvement or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A galvanometer comprising a case, a pair of blocks at least one of which is mounted in the case, a pair of suspension rods spacing said blocks apart, a core supported by and positioned below said rods between said blocks, a spider rotatably mounted on each of said blocks, a projecting tab on each spider for manual rotation thereof, an arm on each spider, a coil suspended for free movement about said core, suspension wires connecting opposite ends of said coil to said spider arms, means extending externally of said case adapted to engage one of the spider tabs for adjustment thereof, a pointer mounted to be actuated by said coil, a scale plate fastened into said case and with which said pointer cooperates, a clamp slidably mounted in said case between locking and unlocking positions, and a frame carried by said clamp, said frame being shaped to engage the windings of said coil and adapted to lift said coil into a fixed position.

2. A galvanometer according to claim 1, wherein the means connecting the spiders to said coil comprise a pair of brackets secured to opposite ends of said coil, resilient looped arms on each of said brackets, and a pair of suspension wires connecting said arms to respective arms of the spiders.

3. A galvanometer according to claim 2, wherein each block carries a collector ring electrically connected in the galvanometer circuit and a clamping screw engaging each of the spiders and holding the same in contact with said collector rings respectively, said spiders being bowed for frictional engagement between the collector ring and clamping screw.

References Cited in the file of this patent

UNITED STATES PATENTS

| | | |
|---|---|---|
| 819,071 | La Roche | May 1, 1906 |
| 998,594 | Aronson | July 25, 1911 |
| 1,528,221 | Lush | Mar. 3, 1925 |
| 2,045,677 | Schock | June 30, 1936 |
| 2,132,617 | Harrison | Oct. 11, 1938 |
| 2,237,552 | Ellis | Apr. 8, 1941 |
| 2,326,252 | Rich | Aug. 10, 1943 |
| 2,506,648 | Niemann | May 9, 1950 |
| 2,539,158 | Parsegian | Jan. 23, 1951 |